United States Patent [19]
Rodrigues et al.

[11] Patent Number: 5,513,316
[45] Date of Patent: Apr. 30, 1996

[54] METHOD AND APPARATUS FOR EXERCISING AN INTEGRATED SOFTWARE SYSTEM

[75] Inventors: Northon Rodrigues; Gregory A. Miller, both of Portland; William E. Tracy, Jr., Wilsonville, all of Oreg.

[73] Assignee: Computervision Corporation, Bedford, Mass.

[21] Appl. No.: 396,275

[22] Filed: Feb. 28, 1995

Related U.S. Application Data

[63] Continuation of Ser. No. 72,353, Jun. 3, 1993, which is a continuation of Ser. No. 579,407, Sep. 7, 1990, abandoned.

[51] Int. Cl.$^6$ ................................................. G06F 11/00
[52] U.S. Cl. ................................ 395/183.14; 395/183.21
[58] Field of Search ................................................. 395/570

[56] References Cited

U.S. PATENT DOCUMENTS 5,119,377  6/1992  Cobb et al. ................................ 371/19

OTHER PUBLICATIONS

Que's Computer User's Dictionary © 1990 by Que Corp. p. 283.
*Running MDSDOS®* by Van Wolverton, published by Microsoft Press, © 1989 by Van Wolverton, pp. 324–358.
SunView 1 System Programmer's Guide, Revision A, of May 9, 1988 pp. 80–81, 91–92.
OS2 Professional Magazine Sep. 95 pp. 54 & 64.
OS2 Professional Magazine Jun. 94 pp. 19–22.
IBM® Direct *Desktop Software* catalog Spring 1995.
Microsoft Press® *Computer Dictionary*, Second Edition © 1994 by Microsoft Press, p. 41.

*Primary Examiner*—Vincent P. Canney
*Attorney, Agent, or Firm*—Greenfield & Sacks Wolf

[57] ABSTRACT

A method and apparatus are provided for the testing, training on, demonstration of, or otherwise exercising an integrated and interactive software system in the environment in which such a system is to be utilized. A tool used for accomplishing these objectives has a record mode in which a unified input queue (UIQ) is generated of all inputs to the system when the system is being utilized to perform an exemplary function. In play mode, the system normally operates in response to inputs from the UIQ, which inputs are provided in the same sequence and with the same duration between inputs as when recorded. Controls are provided to permit selection of application tools which are to be recorded and which are to be played back, to control portions of the operations which are to be recorded, to edit the UIQ to add, delete or change inputs, to move forward or backward by controlled amounts in the UIQ in play mode and to control the rate at which inputs are applied to the system in play mode. The operation may also be paused in either record or play mode and additional operations may be entered during a pause in play mode.

49 Claims, 9 Drawing Sheets

```
# DURATION (milliseconds) Event x y Canvas
    *** EPIC ***
0     MOV  734 588 0
20    LEFT 818 476 0
40    MOV  822 458 0
60    MOV  862 356 0
140   MOV  866 352 0
60    CENTER 866 352 0
180   MOV  867 348 0
    *** SCHEDIT ***
2110  MOV  304 635 0
60    MOV  314 649 0
525   :text howdy planet
120   MOV  75  154 0
40    MOV  100 200 0
40    LEFT 100 200 0
    *** DV ***
1562  LEFT 200 200 1
# Calling shelltool with standard sunview    ←——— 102
# parameters
sys/usr/bin/shelltool-Wp 17 376 -Ws 719 516 -Wp 1008 108
365   KB q
    *** EPIC ***                     ———— 104
40    MOV  353 200 0
20    LEFT 818 476 0
    *** SCHEDIT ***
1289  : get 244    ←——— 100
223   MOV  676 45 0
40    LEFT 676 45 0
333   CENTER 676 45 0
83    : get 2114
223   MOV  676 105 0
40    LEFT 676 105 0
327   CENTER 676 105 0
66    : write 2kram
45    KB r
78    : quit
                    ———— 98
```

METHOD AND APPARATUS FOR EXERCISING AN INTEGRATED SOFTWARE SYSTEM

This application is a continuation of application Ser. No. 08/072,353, filed on Jun. 3, 1993, which is a continuation of Ser. No. 07/579,407, filed on Sep. 7, 1990, now abandoned.

FIELD OF THE INVENTION

This invention relates generally to the testing, training, and demonstration of software systems and, more particularly, to a method and apparatus for flexibly exercising integrated software systems in the environment in which such systems are to be utilized.

BACKGROUND OF THE INVENTION

To assure the quality and accuracy of computer software products and of systems utilizing such products, it is necessary that such products and systems be thoroughly tested before being delivered to customers. However, as such software products become more complex and in particular where these software products are being utilized in a highly interactive and integrated system, the testing of such products becomes increasingly complex and time-consuming. Automated software testing programs and procedures are, therefore, becoming essential in quality assurance work.

However, particularly in integrated software systems, it is important that the testing be performed in the same manner and under the same conditions as the system will be used by the customer. Thus, the various program products cannot be tested discretely, but must be tested as part of the integrated system in a typical operating environment.

Another problem is that the most probable locations for error are the points of interface of the software product with the other software products and with the user. It is, therefore, desirable to be able to run a software system in a test mode which permits looking at all inputs to the system as they are generated. While some test technologies have been developed which allow the capture and playback of program interactions, these technologies have not functioned well at capturing mouse movement and mouse and menu "point and click" paradigm. They also do not have the flexibility to permit production code as opposed to test code to be run in the same manner as such programs would be run by the customer and, in particular, do not address an integrated tool environment. Finally, such techniques generate huge log files and lack flexibility to permit a person doing testing to move forward and backward in the software products and in the procedures as desired to isolate problems, or to add new inputs at various points in the procedure to verify suspected problems, to assist in isolating problems or for other purposes.

Another technique sometimes used for testing software involves generating command scripts which are a sequence of commands put together in a format which the software product or tool understands. Such command scripts are designed to work with only a single software tool and do not provide either for interactions with the user or with other tools in an integrated system. Further, once a command script is started, the user loses control until the script is ended since the command scripts do not return control to the user.

A need, therefore, exists for an improved technique for testing complex integrated software systems involving a number of interactive program products or tools, which technique permits the system to be operated in any desired environment; and which permits mouse and other inputs to be collected for replay in a test environment. However, the system should at all times provide the user with the capability to stop the operation and make any entries which the user/tester wishes in either record or playback, to move forward or backward in a playback operation, to skip over selected portions of the operation, to run the playback in a step-by-step mode with steps of selected size, and to provide the user with other capabilities which permit him to retain complete control of the testing operation. Such a system should be flexible enough to operate with any, or substantially any, software products so that new software tools do not have to be generated each time a new software product is added to the system, or some other change is made in the system. The system should permit all of the software products in the system to be tested together or the testing of any selected combination of the software products available in the system. Further, in addition to being useful for testing the system, such a flexible playback capability would also be useful in performing demonstrations of a system or for training personnel in the use of a system.

SUMMARY OF THE INVENTION

Thus, this invention provides a method and apparatus for the flexible testing or other exercising of a system employing a plurality of integrated and interactive software products. Basicaly, the system involves recording the inputs to the system as the system is being operated to perform an exemplary function or functions. The inputs are stored in a unified input queue (UIQ) which UIQ may then be utilized to exercise the system when in a play or testing mode. When in a play mode, the running of the UIQ may also be paused to permit the user to enter additional inputs, the readout from the UIQ may be rewound, fast-forwarded, advanced by a selected frame or frames, operated in a step-by-step mode with steps of selected size, and otherwise controlled to achieve desired objectives.

More particularly, the invention provides a program or tool and a method for the use thereof to test or otherwise exercise an integrated system utilizing one or more software products. The tool is first placed in a record mode. When the tool is in the record mode, the system, including selected ones of the software products, are utilized to perform one or more selected functions. A unified input queue (UIQ) is generated containing all inputs to the software product in the order utilized and the UIQ is stored.

The stored UIQ may then be utilized by the tool to test, demonstrate or otherwise exercise the system. The UIQ may include information as to the software product for a given input stored therein. It may also include information as to the duration between inputs stored therein and an indication of the source of a given input. Where the input source is a mouse, the UIQ may also include an indication of mouse movement and of the final location of a mouse at the end of movement. Where the mouse has one or more buttons, the UIQ may include indications of the operation of a particular button and the mouse location where such operation occurs. This is useful in, for example, identifying where menu selections are made. Keyboard inputs may also be indicated, comments may be included in the UIQ and calls from system software products may also be stored therein. Where an input is utilized to control a display window, an indication may also be stored indicating the display window for a given input. Finally, the system may be paused at any point when in the record mode, permitting the user to record only such portions of the operation as he is interested in recording, or permitting the user the flexibility to make other changes in the UIQ.

The stored UIQ may then be used, either in the same system or in a different system, for test demonstrations, training or other purposes by putting the tool in a play mode. When the tool is in a play mode, inputs from the UIQ are applied to the system in the order recorded. Stored duration information may be utilized to control the time at which inputs are applied to the system, inputs normally being applied to the system at a rate indicated by the stored durations between successive inputs. However, the duration between instructions, and thus the play rate for the tool, may be altered to be either faster or slower than the record rate.

The tool may also be paused to permit additional inputs to be applied to the system or for other purposes, with the running of the UIQ being reinitiated in response, for example, to the user reoperating a pause control. Frame indications may also be stored in the UIQ and tool controls may be provided for moving to a selected frame in the UIQ for applying further inputs to the system. Such controls may, for example, be a rewind control for rewinding to the beginning of a previous frame or an advance to the next frame control for advancing to the beginning of the next frame. It may also be possible (a) to define steps consisting of N inputs each and for playing inputs from the UIQ back on a step-by-step basis; and (b) to indicate that one or more inputs are to be skipped and for advancing a response to such an input by a predetermined number of inputs in the UIQ. Since the tool may operate in a plurality of different modes, including record mode, play mode, pause mode, and the like, the tool may also include means for indicating to the user the mode in which the tool is operating at any given time.

A capability may also be provided to permit the user to select the particular tools which are to be utilized for any given UIQ and to permit the user to edit the UIQ to eliminate extraneous instructions and inputs to keep the UIQ from becoming excessively large.

The foregoing and other objects, features and advantages of the invention will be apparent from the following more particular description of a preferred embodiment of the invention as illustrated in the accompanying drawings.

DETAILED DESCRIPTION

While this invention might be utilized to test, debug, demonstrate, or otherwise exercise any software product, it is particularly adapted for use in systems which employ a number of applications programs which operate integrally and interactively with each other. Such application, software products or programs will sometime also be referred to hereinafter as "tools". An example of an environment in which such integrated and interactive tools are utilized are various designs and production automation systems, including systems of the type discussed in copending application Ser. No. 07/543,048, filed Jun. 25, 1990, and assigned to the assignee of the instant application.

Figure 1:
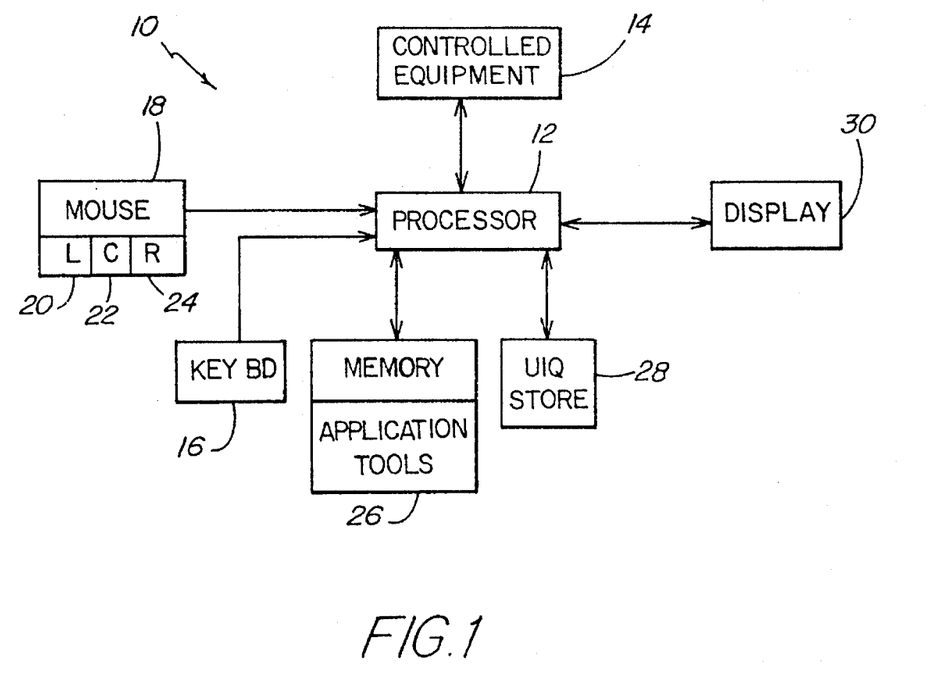
FIG. 1 is a block diagram of a system in which the teachings of this invention may be utilized.

FIG. 1 illustrates the type of environment in which the testing tool or technique of this invention might be utilized. The system 10 shown in this figure utilizes a processor 12 to control various equipment 14 such as equipment used in automated design and production. Inputs to processor 12 may be received from a number of devices, including a keyboard 16 and a mouse 18 having left, central and right click buttoms 20–24, respectively. Processor 12 has one or more memories 26 in which various application tools may be stored. Memory 26 may also contain data to be used by the system and other information. A store 28 is also provided for a unified input queue (UIQ). This may be a separate storage device, but is typically one of the standard storage or memory devices 26 utilized by the processor. The UIQ store may, for example, be a floppy or hard disk. A floppy diskette or tape is preferable where it may be desired to transport a UIQ generated at one site or processor to another site or processor where the testing or other use of the UIQ is to be performed. Finally, a display 30 is provided which permits the user/tester to interact with system 10 in a variety of ways, some of which will be discussed hereinafter.

Figure 2:
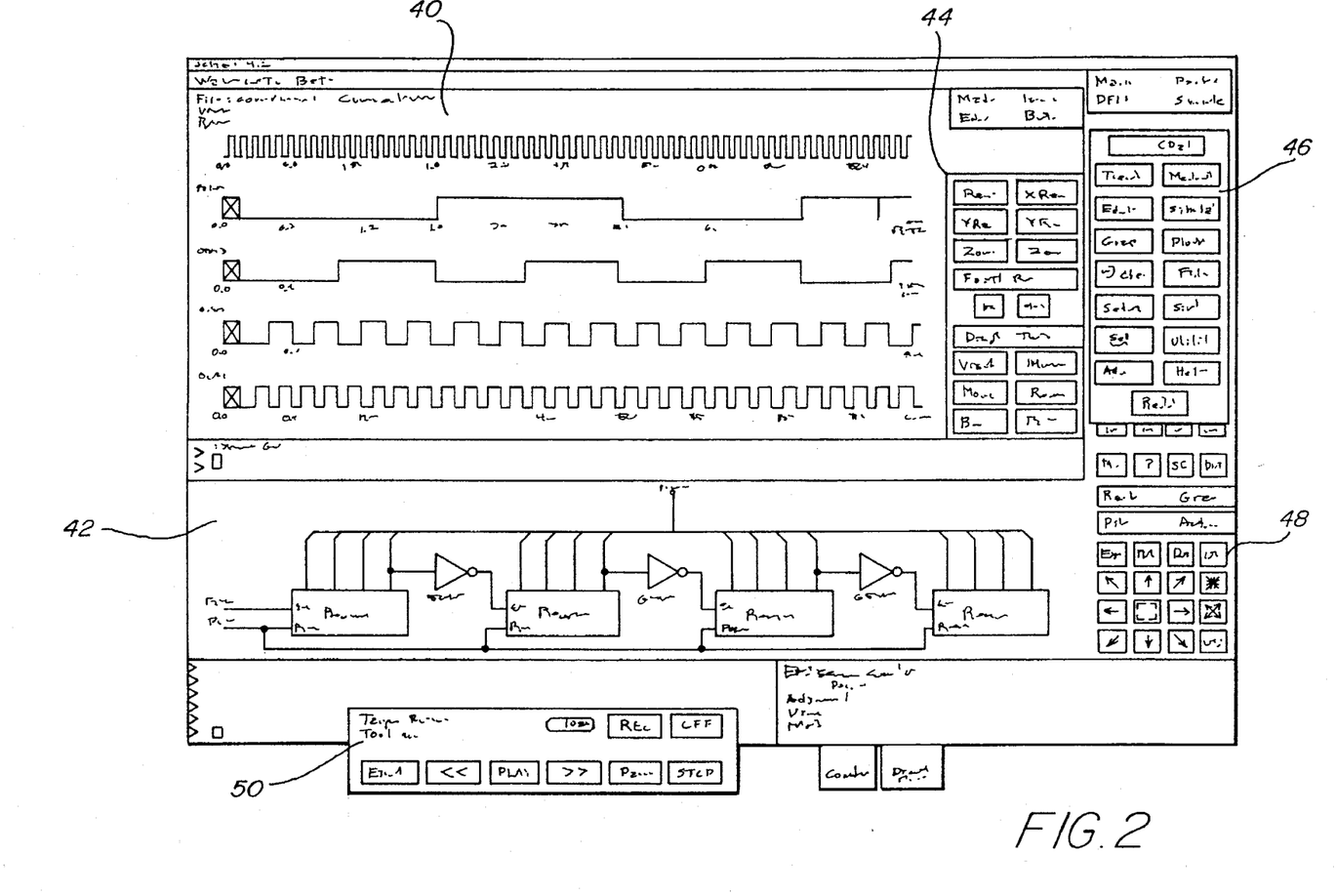
FIG. 2 is an illustration of an exemplary display which might be generated when utilizing the teachings of this invention.

FIG. 2 shows an exemplary display which might appear on display device 30 when a testing operation is being performed on, for example, a design automation system. This display contains various windows which are displaying information or icons for various ones of the applications tools being used with the system. For example, in FIG. 2, a window 40 displays various waveforms, while a window 42 displays a circuit which a user may be designing to generate the waveforms shown in window 40. Various icon menus appear in windows 44, 46 and 48 which may be utilized to control the displays in windows 40 and 42 or to change the applications program being run or the configuration of the windows as required for the operation being performed. In performing operations in accordance with the teachings of this invention, the user would run the various applications programs to perform an exemplary design, production, or other operation, causing displays such as those shown in FIG. 2 to appear on the screen, and would utilize input devices such as keyboard 16 and mouse 18 to make menu selections or to otherwise make modifications in the design or to otherwise control the running of the various applications. As will be discussed in greater detail later, these are the inputs which are collected in the UIQ. In running the various applications programs, information and instructions are also exchanged between the applications tools.

Figure 3:
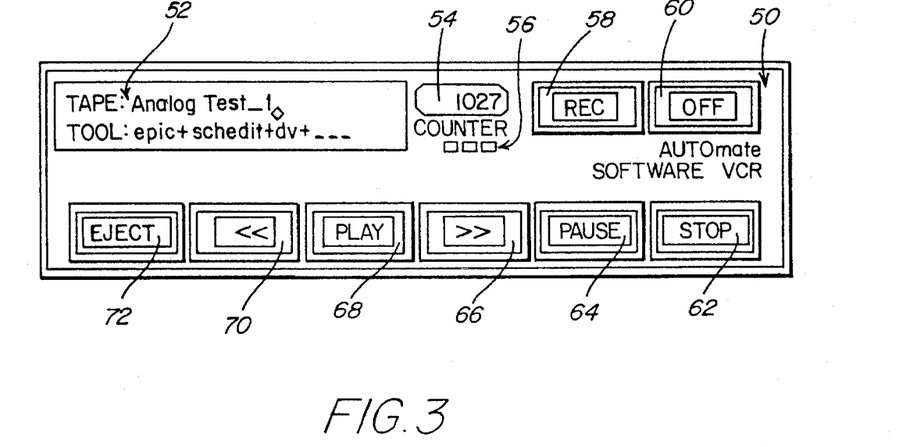
FIG. 3 is an enlarged view of the user interface portion of the display shown in FIG. 2 which is utilized in practicing the teachings of this invention.

Of most interest in FIG. 2 is the window 50 which is a user interface for the routine of this invention which will sometimes be hereinafter referred to as the "Automate" tool. FIG. 3 is an enlarged view of the window 50. In the upper left-hand corner of the interface window is a status window 52. This window indicates on the first line the name of the tape file which is loaded or, in other words, the particular UIQ which is being recorded or played. The second line of window 52 indicates the tools (i.e. the software products) on which operations are being performed and thus the tool(s) for which inputs will be recorded during record mode and the tools for which inputs are played back during play mode.

Window 50 also has a counter 54 which indicates the precise line number of an input or other entry in the UIQ which is being recorded or played. Counter 54 assists in the maintenance of the UIQ.

Below counter 54 are a series of status indicators 56. Where the display of window 50 is in black and white, a selected one or more of the indicator areas 56 may be darkened to indicate that the Automate tool of this invention is in record mode, play mode, pause mode or the like. With a color display, the color of one or more of the indicators 56 may be changed to indicate mode status. Alternatively, LED's may be used as the indicators 56 to perform this function.

The remainder of window 50 contains areas which function as input buttons to the automate tool. These input areas or buttons include a Record button 58 which toggles record mode on and off. As with other menu selections from the display shown in FIG. 2, the menu selections from window 50 may be made by use of mouse 18 or by other suitable means known in the art. As will be discussed in greater detail later, when Record button 58 is selected, a menu appears on display 30 of the tools which are available for recording. The user may make a selection of appropriate tools from this menu. An appropriate indicator 56 is also illuminated.

Next to Record button 58 is Off button 60, the selection of which causes processor 12 to exit the Automate routine. Below Off button 60 is Stop button 62. Selection of this button stops the running of Automate in whatever mode it is in.

To the left of Stop button 62 is Pause button 64. The pause button is the only one which may be utilized in either record or play mode. In record mode, the operation of the Pause button tells the various system tools to no longer send their inputs to be stored in the UIQ. In the play mode, selection of pause causes the UIQ to no longer be read out to provide inputs to the various system tools. Pause mode differs from stop in that the system is still operative when in pause mode and will execute instructions provided by the user. Pause button 64 is a toggle control so that operation of the Pause button when the tool is in pause mode will cause normal record or play to resume. An indicator 56 may be illuminated when the tool is in pause mode.

To the left of Pause button 64 is Fast Forward button 66. Selection of this button causes the UIQ being run in play mode (fast forward not being usable in record mode) to be advanced in a predetermined way. When fast forward is selected, a pop-up menu is displayed, indicating various options available for advancing the UIQ, including speeding up the advancing, slowing the advancing down, or skipping selected inputs. The user can select a desired mode of advancing from this menu.

The Play button 68 is selected to place the tool in play mode. Selecting play may also cause a pop-up menu to appear, indicating various play modes, including step-by-step. When the Play button is operated, a selected indicator 56 is also illuminated.

Next to play button 68 is Rewind button 70. Selection of this button rewinds the UIQ file to the beginning of the previous frame. A frame is generally defined as a point in the UIQ containing all information necessary to start playing back the tools from that point on. The UIQ would contain frame markers at the beginning of each frame. Selecting rewind may merely cause playback to move back to the beginning of the previous frame or additional rewind options may be provided. For example, the UIQ may return to the beginning of the previous frame if rewind is selected with left button 20 of the mouse and a menu of other rewind options may be displayed if rewind is selected by energizing right button 24 on the mouse. Other rewind options may include rewinding to the beginning of the UIQ file, rewinding by a single input, or rewinding by (N) inputs with the user being able to select the number (N).

The final button of user interface 50 is Eject button 72. Selection of eject removes a file from Automate, clearing the name of the file from the first line of status area 52, and also verifies whether write protect is required for the file. Verifying write protect may be achieved by providing a pop-up menu on display 30 from which the user can, for example, by use of mouse 18, indicate whether the particular UIQ file is to be write protected.

Figure 4:
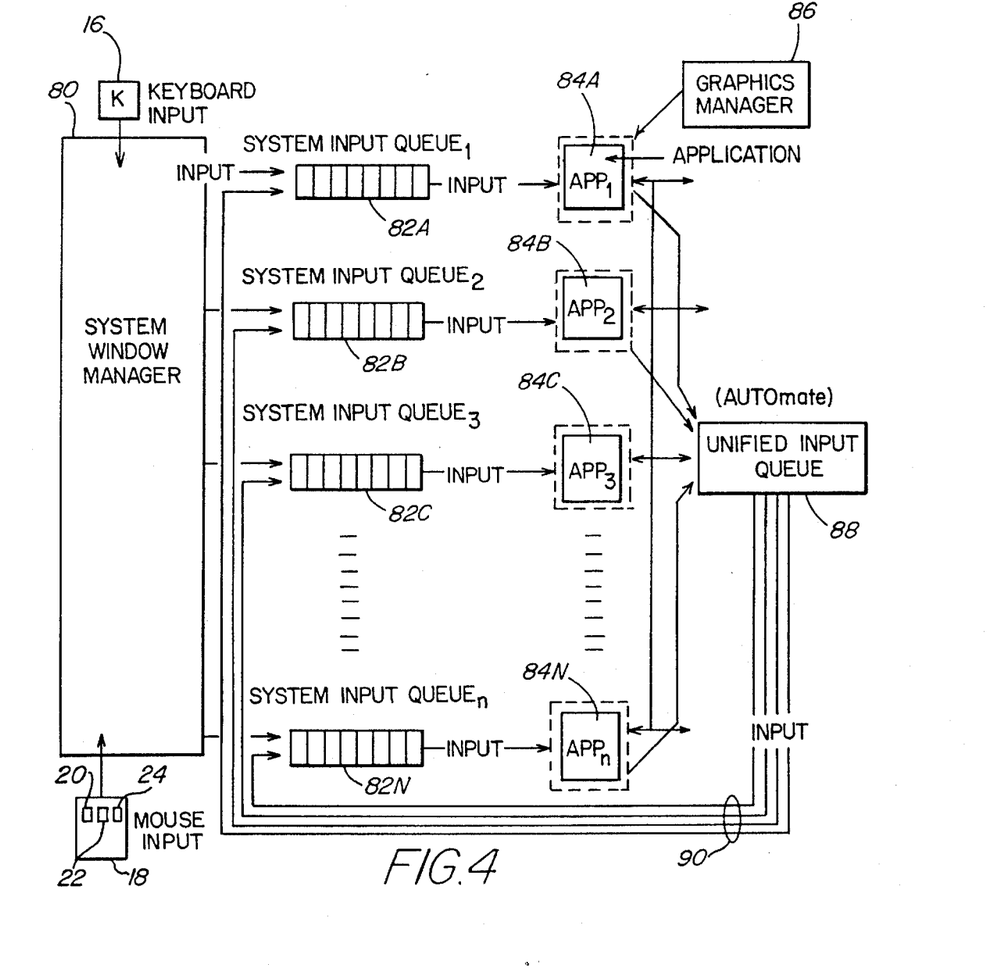
FIG. 4 is a block diagram illustrating the generation and use of the unified input queue.

FIG. 4 illustrates the various tools which would be utilized in a system of the type shown in FIG. 1 in practicing the teachings of this invention and the interactions between such tools. Inputs from keyboard 16 and mouse 18 are received in processor 12 by a standard system window manager tool or by another equivalent tool which is adapted to route inputs to the system into a system input queue 82A–82N for the appropriate applications tool 84A–84N. A graphics manager program 86 can be utilized to control the application of inputs to the various application tools 84 and to assure that such inputs are also applied to unified input queue (UIQ) 88. Since interactions between applications tools will automatically be created when the tools are run in a play mode, in order to reduce the size of the UIQ, it is not be necessary to include such interconnect inputs in the UIQ.

The sequence of operations described above occur when the system is in a record mode. When the system or tool is in a play mode, the inputs from UIQ 88 are applied through line 90 to the appropriate input system queues 82. As will be discussed shortly, an identification is stored with inputs which permits the application tool 84 to which the input relates to be identified, and thus permits such input to be routed to the appropriate input queue 82. Thus, when in play mode, inputs would not be received from keyboard 16, mouse 18 or system window manager 80 unless Pause button 64 is activated, stopping the flow of inputs from UIQ 88, and permitting inputs to be applied by a user through the system window manager to appropriate input queues 82. However, since inputs are being applied to the system by Automate in play mode at the same relatively low rate that they were originally generated, the system may be running other software in response to user inputs in parallel or synchronously with the operations being run from the UIQ. One way that this capability may be utilized to perform, for example, training, will be discussed later.

Figure 5:
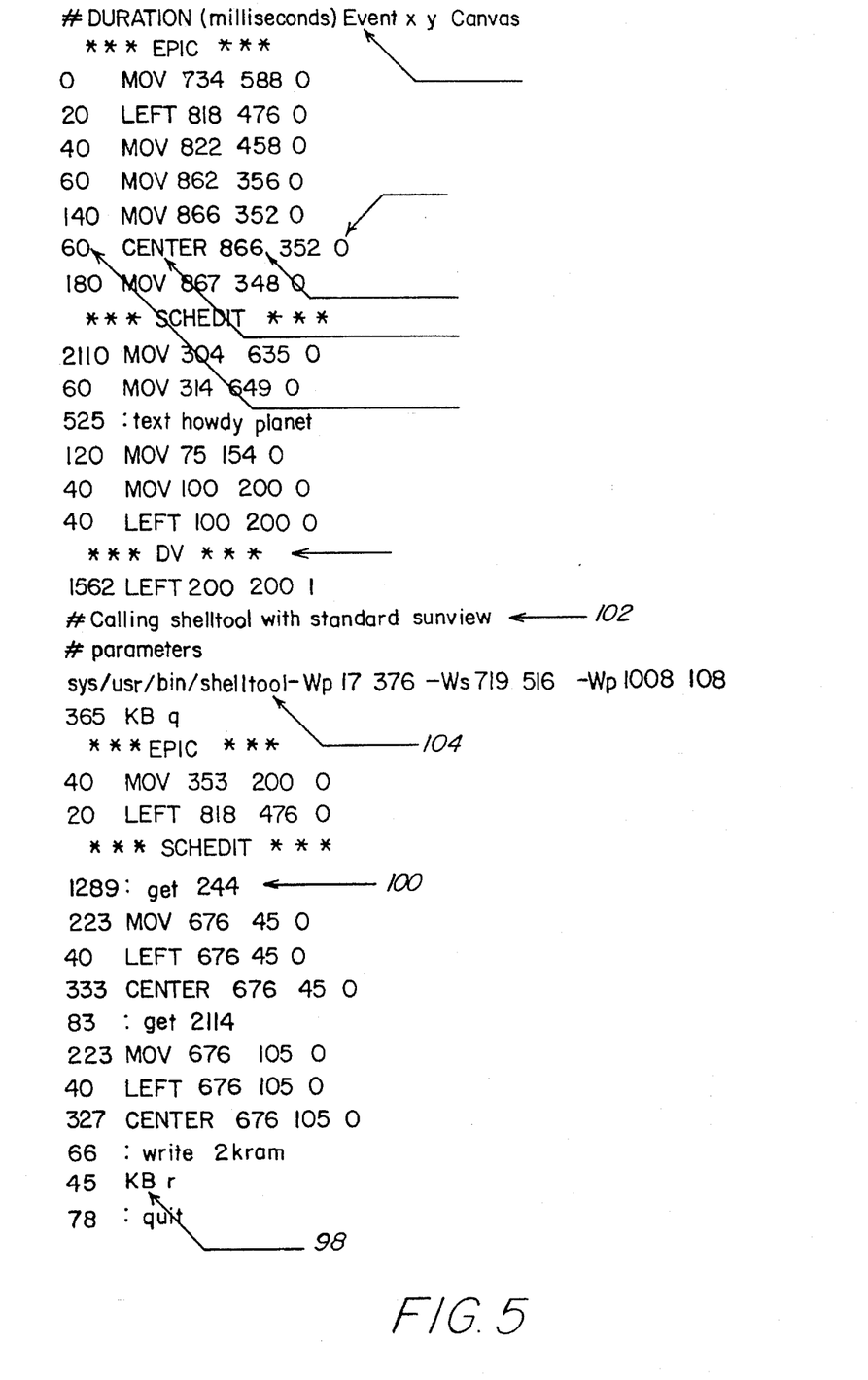
FIG. 5 is a listing of an illustrative portion of a unified input queue.

FIG. 5 illustrates a UIQ file for an exemplary frame. Each input entry stored in the UIQ may have four parts or fields, some of which may not be utilized or appropriate for a given entry. The first part of each input is a duration indication which may, for example, indicate duration in milliseconds between a prior input and the current input. Thus, the duration for the first input is 0, the second input occurs 20 milliseconds after the first, the third 40 milliseconds after the second, the fourth 60 milliseconds after the third, the fifth 140 milliseconds after the fourth, the sixth 60 milliseconds after the fifth, etc. The second part of the instruction indicates the action called for by the input. MOV means that the mouse has been moved. "Left" and "Center" indicate that left button 20 and center button 22, respectively, have been operated on the mouse. KB indicates a keyboard input.

The third part of the input is an X-Y indication which is used primarily with mouse inputs. It could also be used with roller ball, lightpen, or other inputs where an X-Y location is significant in connection with the input. For a "MOV" input, the coordinates are the coordinates where the move ends. Thus, for the first input, the move ends at a position having an X value of 734 and a Y value of 588. For button inputs, the X-Y indications indicate the location of the mouse when the button is operated. Thus, the second input indicates that the left button was operated at position X=818, Y=476. This may, for example, be the position of a particular menu icon, the mouse being in this position when the left button is operated, indicating that a selection has been made from the menu.

The fourth column indicates the window in which the particular input is to appear. For example, a 0 in this field might represent the window 40, including the icon menu 44 shown in FIG. 2, while the number 1 in this field might represent the window 42, including icon menu 46.

In addition, the UIQ contains an indication of the software tool which the inputs are intended for. Thus, the first seven inputs relate to a software tool called "Epic". This is represented by the word "Epic" appearing prior to these inputs in the file. The next six inputs are for a tool called "Schedit" with a few instructions thereafter being for a tool called "DV". The remaining inputs are for Epic and Schedit as indicated.

There are also two types of keyboard inputs. One type is headed by the character "KB" followed by a character which is to be written. This is illustrated by, for example, entry 98 in the listing. The second type of keyboard input are application tool commands, an illustration of which is the command 100 in the listing. Such commands are shown as being preceded by a colon.

The UIQ may also contain comments such as the comment 102 which are for the benefit of the user and may either be reviewed in a program listing or may be displayed. Comments are normally preceded in the listing by a (#). Finally, the UIQ may contain system call inputs such as entry 104. These are inputs which are applied to the operating system of processor 12 to cause desired operations to be performed rather than to one of the applications tools.

In play mode, the various inputs would be loaded into the input queue 82 for the applications program indicated for the input, the duration between applied inputs normally being that indicated in the first field of the input entry.

Record Mode Operations

Figure 6:
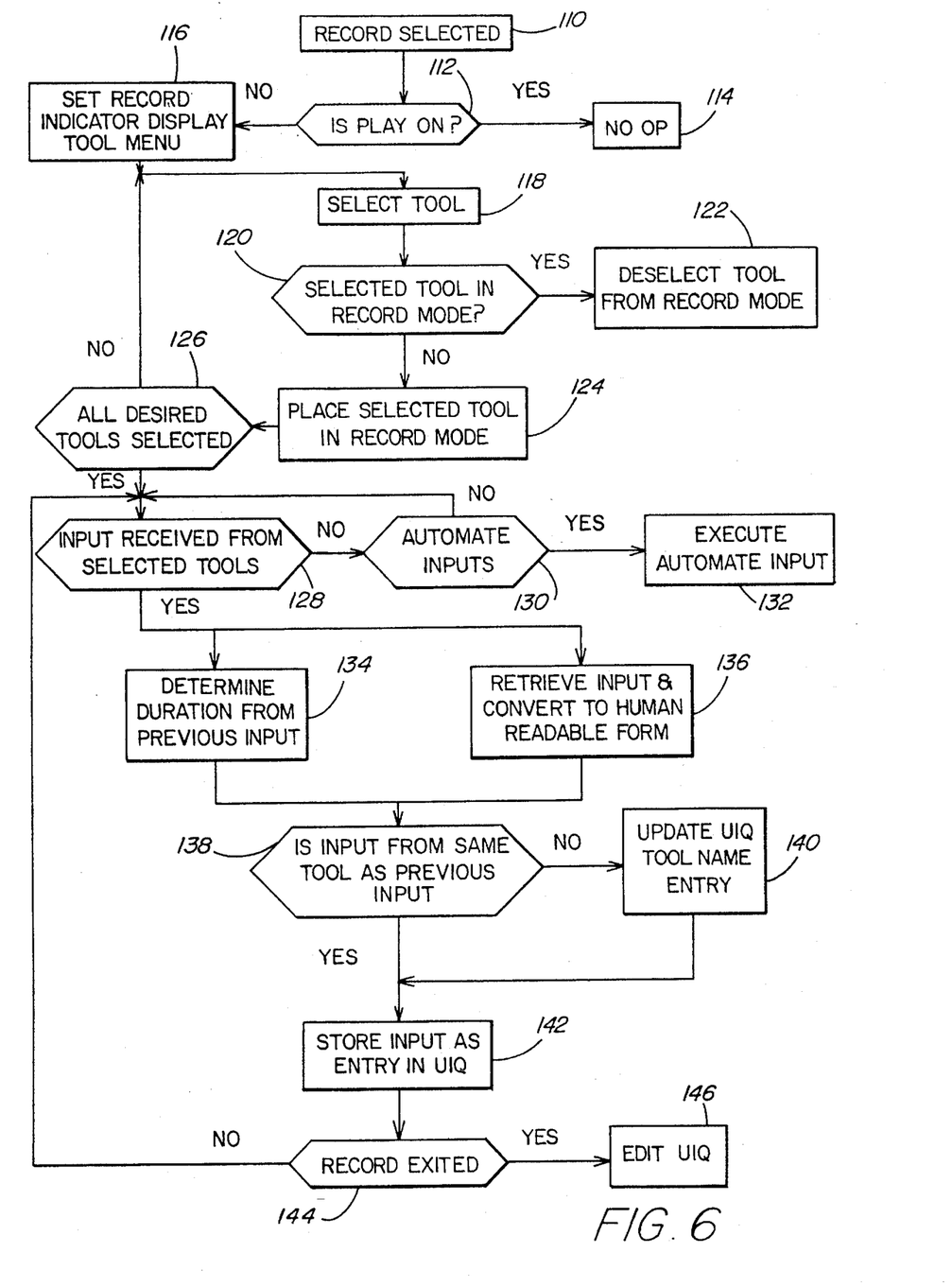
FIG. 6 is a flow diagram of a record process in accordance with the teachings of this invention.

FIG. 6 is a flow diagram illustrating the operation of the system to perform a record operation. Record mode operation is entered from step 110 when the user operates Record button 58 of user interface 50. When the Record button is activated, the operation proceeds to step 112 to determine if the tool is in play mode. If the tool is in play mode, a record operation cannot be performed and the operation branches to step 114 to exit the record routine and to provide the user with an indication that a record cannot be performed because the tool is in play mode.

If it is determined that the tool is not in play mode, the operation proceeds to step 116 to set the appropriate indicator or indicators 56 to indicate that the tool is in record mode. At the same time, a pop-up window is provided, indicating to the user the application tools which are available for use in the record mode. During step 118, the user makes a selection from the tool menu. This may be done, for example, by use of mouse 18. One option which may be provided to the user on this menu is "All". If the user selects "All", then record would be for all application tools available in the system.

During step 120, a check is made to determine if the selected tool is already in the record mode. As previously indicated, record button 58 is a toggle control. Therefore, if the selected tool is already in record mode, the operation proceeds to step 122 to deselect a tool from record mode. This results in inputs to the deselected tool no longer being recorded in the UIQ. Steps 120 and 122 provide the system with the capability to selectively add or delete tools from the tools being recorded in the UIQ. The user thus has great flexibility in setting up his test or other procedures. These steps may be performed for each tool if "All" is selected during step 118, but would preferably not be performed for this selection.

If the selected tool is not already in record mode, the operation proceeds to step 124 to place the selected tool (or tools if "All" is selected) in record mode. From step 124, the operation proceeds to step 126, during which a determination is made as to whether all desired tools have been selected. If all desired tools have not been selected, the operation returns to step 118 during which the user selects an additional tool from which inputs are to be recorded. The operation then proceeds through steps 120–124 for the new tool and to step 126 to determine if all desired tools have been selected. This sequence of operation is repeated until, during step 126, the user makes an appropriate menu selection, such as selecting "Enter", to indicate that the tool selection process has been completed.

When a "Yes" output is obtained during step 126, the operation proceeds to step 128 during which the operation waits to receive an input from a selected tool. If an input is not being received from a selected tool, the operation may proceed to step 130 during which the user may make an appropriate Automate input, such as operating Pause button 64 or Eject button 72. If an Automate input is generated during step 130, the operation proceeds to step 132 to execute the automate input. Thus, if the Pause button were selected during step 130, during step 132 appropriate steps would be taken to terminate the sending of inputs to the UIQ. If the Eject button or Off button were selected, the record operation would be terminated. If during step 130 no Automate input is generated, the operation returns to step 128 to wait for the receipt of a tool input.

When an input for a selected tool is received, the operation proceeds to perform steps 134 and 136. During step 134, a determination is made of the duration from the previous input recorded in the UIQ. This is done by, for example, having a clock which is reset when each input is recorded and storing the value on this clock when a new input is received. The duration determined during step 134 is stored in the duration field of the UIQ entry for the received input. During step 136, the received input is retrieved and converted to human readable form. An example of inputs in a human readable form is shown in FIG. 5. While it is desirable that the inputs be in a human readable form so that the person exercising the system can view an input sequence either on display 30 or in a printout to assist in a testing, debugging, training or other process, this is not a limitation on the invention and the inputs could also be recorded in a machine readable form. Information for the right-most window field shown in FIG. 5 would also be retrieved and corrected during step 136.

When steps 134 and 136 have been completed, the operation proceeds to step 138 to determine if the input is from the same tool as the previous input. If the input is not from the same tool as the previous input, the operation proceeds to step 140 to update the UIQ tool name entry. For example, referring to FIG. 5, the tool entry for the first seven inputs is "Epic". When the eighth input is received, it will be determined during step 138 that this input is not for the Epic tool and that the tool name Schedit must be written in the UIQ as shown in FIG. 5 before the eighth input is entered.

From step 140, if a "No" output is obtained during step 138, or from step 138 if a "Yes" output is obtained, the operation proceeds to step 142 to store the input as an entry in the UIQ. The entry would include the duration determined during step 134 as its first field and the converted retrieved input information obtained during step 136 for the remainder of the entry.

Once an input has been entered in the UIQ, the operation proceeds to step 144 to determine if record mode is to exited. Record mode may be exited in a number of ways, including by operating "Off" button 60 or "Eject" button 72. If record is not to be exited, the operation returns to step 128 to wait for the next received tool input. When the next tool input is received, the operation proceeds through steps 134–142 to enter the input in the UIQ and then again checks to determine if record mode is to be exited.

When during step 144 it is determined that record mode is to be exited, the operation proceeds to step 146 during which the entries recorded in the UIQ are edited to eliminate extraneous inputs and thereby keep the size of the UIQ from becoming excessive. During this operation, unnecessary no-op or null operations may be eliminated and intermediate mouse movement inputs may also be eliminated, unless required for the operation. The editing may be done manually by the user or a suitable text editor program may be utilized for this purpose.

During the editing step, it is also possible to add instructions, calls, internal commands, or other inputs to the UIQ for use during a play operation and/or to make other changes in the UIQ entries. For example, if the tool is being used to demonstrate the system, an Automate "Play" input may be inserted at the end of the UIQ to cause the demonstration to be repeated at the end of each running of the UIQ. An inserted call might be utilized to cause a particular window to appear on the display during the running of the system in play mode to, for example, advise an observer as to what is happening during a demonstration of the system or during a training operation. Further, a person being trained on the system could be performing operations using a separate program in parallel with the running of the UIQ in play mode with pauses being added to the UIQ as internal commands during editing and calls to a separate program being provided which would compare what the trainee has done with inputs being received from the UIQ, advise the trainee as to any errors he may have made and suggested remedial action. The UIQ may then be rewound to repeat a sequence of operations so that the trainee could try again. The editing capability on the UIQ thus substantially enhances the flexibility of the tool and the ways in which it may be utilized.

Play Mode Operation

Play mode may be entered either directly after record mode has been completed, or a UIQ generated during a record mode may be stored and utilized at a later time. Further, while record mode and play mode may be executed on the same processor 12, it is also within the contemplation of this invention that a diskette or tape containing the UIQ may be utilized on a different processor containing the Automate tool.

Figure 7:
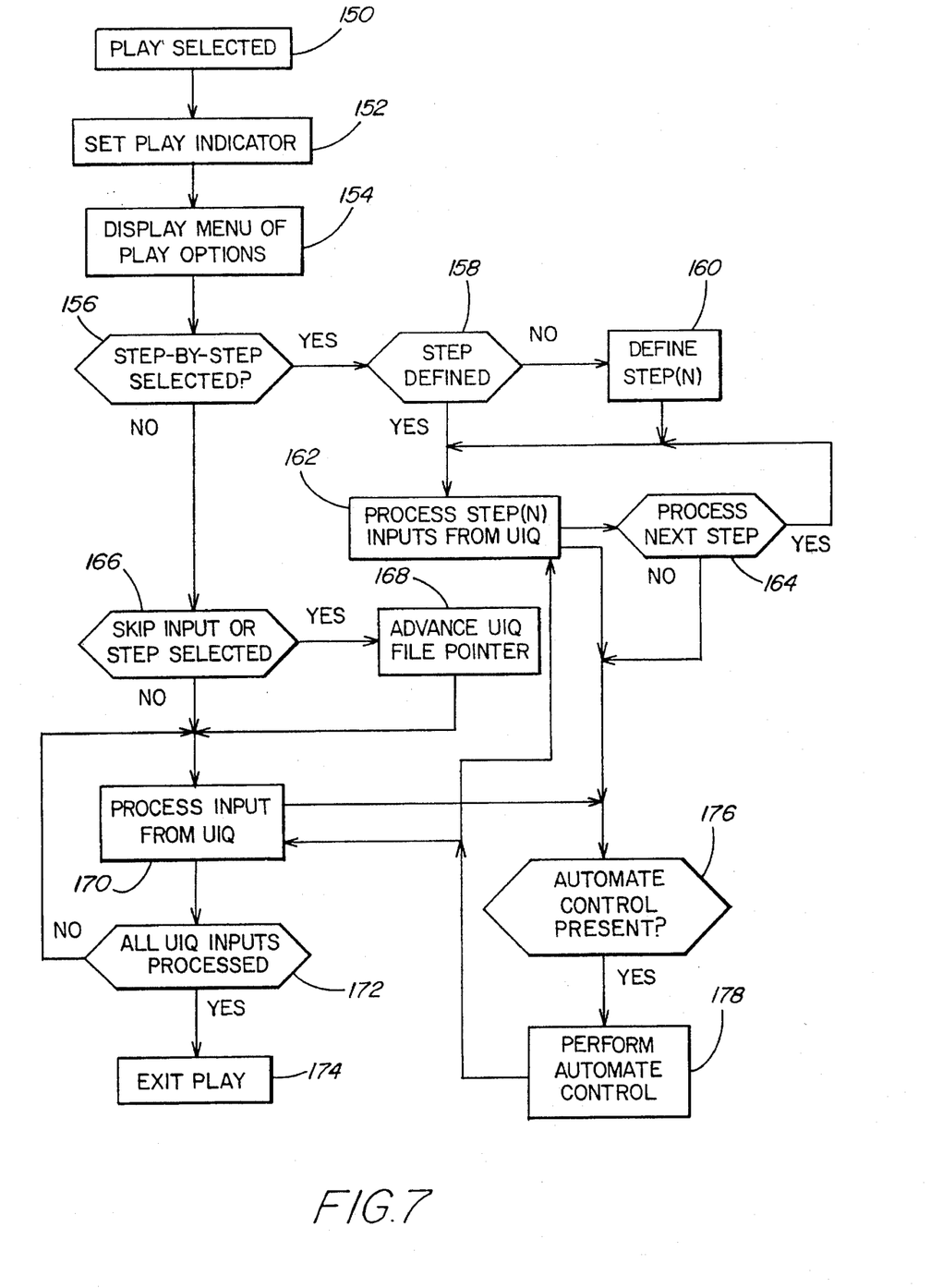
FIG. 7 ms a flow diagram of a play operation in accordance with the teachings of this invention.

FIG. 7 is a flow diagram of operations which may be performed when Play button 68 is operated. When play button 68 is operated, play mode is selected (step 150). This results in the appropriate indicator 56 being set during step 152 to indicate that the tool is in play mode.

The operation then proceeds to step 154 to display a menu of play options. One such option is to perform play in a step-by-step mode. Thus, during step 156, a determination is made as to whether step-by-step has been selected. If step-by-step has been selected, the operation proceeds to step 158 to determine if a step has been defined. A step would be a number of inputs which would be sequentially performed during a given step before stopping. If a step has not been defined, the operation proceeds to step 160 during which the user is prompted to define a step, the user entering a number (N) equal to the number of inputs which the user wishes to have in a step.

From step 160, if a step was not initially defined, or from step 158 if a step was initially defined, the operation proceeds to step 162 to process (N) sequential input entries from the UIQ. When step 162 is completed, the operation proceeds to step 164 to determine if the next step is to be processed. This step might be performed by a prompt appearing on display 30 when step 162 is complete, asking the user if the next step is to be processed. The user could then indicate a desire to process the next step by use of mouse 18 with a suitable icon on the prompt. A "Yes" output during step 164 results in step 162 being repeated for the next (N) inputs in the UIQ.

If a "No" output is obtained during step 156, the operation proceeds to step 166 to determine if a skip-input-or-step has been selected. If a skip-input-or-step has been selected, the operation proceeds to step 168 to advance the UIQ file pointer by a single input or the (N) inputs for a step.

It is assumed in FIG. 7 that the only options for playback provided are step-by-step or skip input, and if these options are not selected, then play is to be processed normally. It is also possible to have a normal play option included in the menu which the user could select. However, the same objective can be achieved by making no selection from the menu and merely operating, for example, an Enter icon. Thus, from step 168 if skip has been selected or from step 166 if a skip has not been selected, the operation proceeds to step 170 to process an input received from the UIQ, input entries being processed in the order stored.

From step 170, the operation proceeds to step 172 to determine if all UIQ inputs have been processed. If all UIQ inputs have not been processed, the operation returns to step 170 to process the next UIQ input and steps 170 and 172 are repeated until, during step 172, it is determined that all UIQ inputs have been processed. When this occurs, the operation proceeds to step 174 to exit the play mode.

At all times when UIQ entries are being processed, the operation is also monitored to determine if an Automate control has been generated. This is represented by step 176. The various Automate controls which may be present, and the effect each such control has on the operation has been mentioned earlier. Some of these controls are also discussed in greater detail later. If during step 176 it is determined that an Automate control has been received, for example, a pause control, a fast forward control, or a rewind control, then during step 178, the Automate control is performed. Such control will affect the processing of inputs from the UIQ during step 162 or 170 by, for example, speeding up or slowing down such processing, causing a frame advance or rewind in such processing, or pausing the operation of such processing. A system and technique for permitting a test operation on an integrated interactive system using a plurality of software tools is thus provided which permits real operations to be performed when in a test or other selected procedure while permitting the user/tester maximum flexibility in controlling and supplementing such operation.

Figure 8:
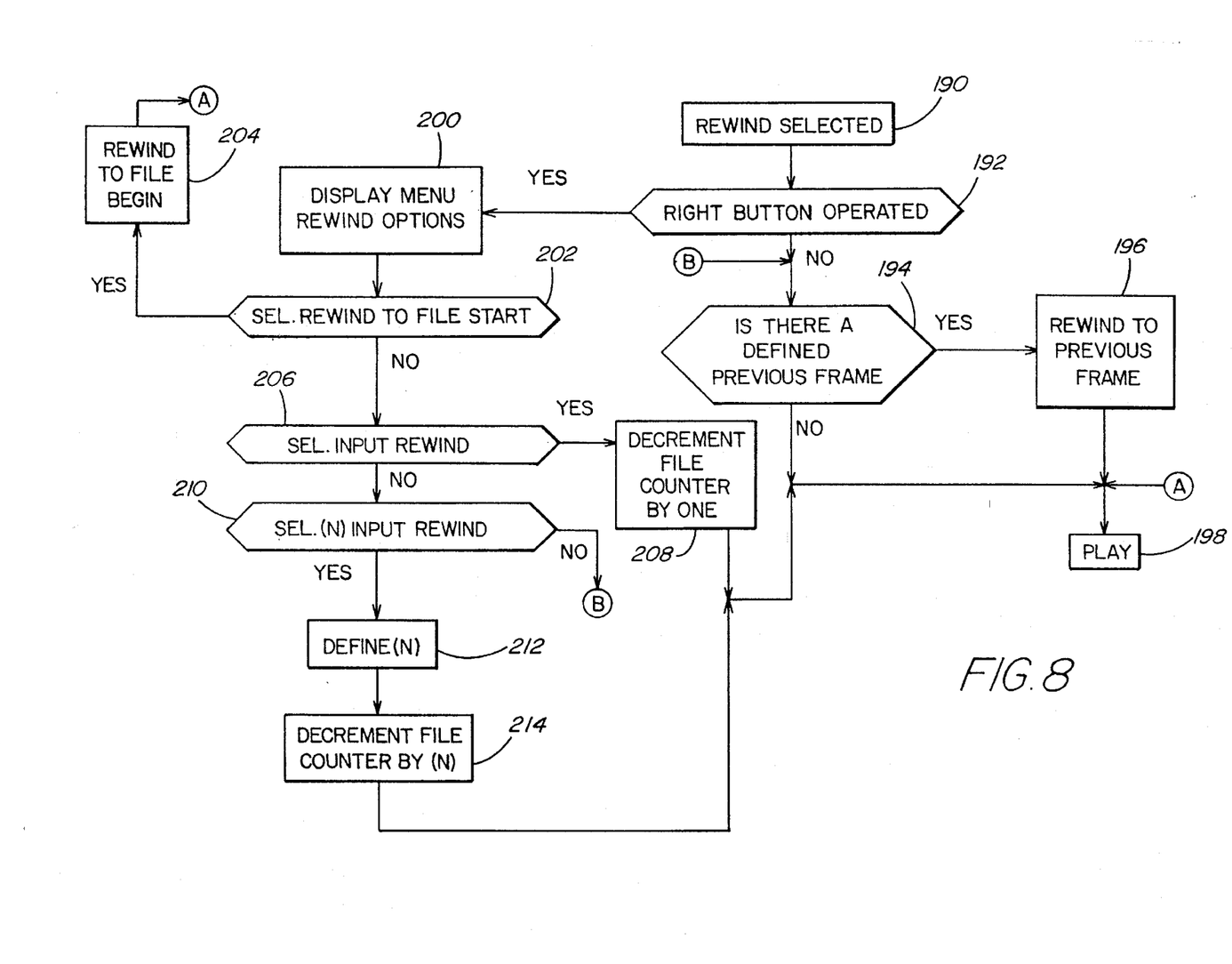
FIG. 8 is a flow diagram of the rewind operation in accordance with the teachings of the invention.

One option from Automate when in the play mode is to select Rewind button 70. This may be used to rerun a selected portion of the operation to, for example, verify test results, to try to identify a bug, or to replay a training session. FIG. 8 is a flow diagram of the rewind operation which provides the user with maximum flexibility in doing rewinds. From FIG. 8, the first step in the rewind operation, step 190, is to select rewind by operating rewind button 70. As previously indicated, this may be done in two ways, namely, by operating left button 20 when the mouse is at rewind icon 70 or by operating right button 24. During step 192, a determination is made as to which of the mouse buttons is operated.

The default condition on rewind is to rewind to the beginning of the previous frame. Thus, if during step 192 it is determined that the left button has been operated (i.e. the right button has not been operated), the operation proceeds to step 194 to determine if there is a defined previous frame. As was indicated earlier, there are frame markers in the UIQ at points in the UIQ file which contain all the information necessary to start playing back the tool from that point on. During step 194, a determination is made as to whether there is such a previous frame marker in the UIQ.

If during step 194, it is determined that there is a previous frame marker, the operation proceeds to step 196 to rewind to the previous frame marker. This is accomplished by resetting or decrementing the file counter to the address at which the previous frame marker is located. From step 196, if there is a "Yes" output during step 194, or from step 194 if there is a "No" output therefrom, the operation proceeds to step 198 to return to the play mode, replaying the UIQ from the address then in its file counter.

If during step 192 it is determined that the right button was operated, then the operation proceeds to step 200 to display a menu of rewind options. From step 200, the operation proceeds to step 204 to determine if the user has selected the rewind-to-file-start option. If during step 202 it is determined that this option has been selected, the operation proceeds to step 204 to rewind to the beginning of the UIQ. This is accomplished by resetting the file counter to the address of the first entry in the UIQ currently being utilized. From step 204, the operation proceeds to step 198 to resume play mode, rerunning the operations from the UIQ starting from the first input therein.

If a "No" output is obtained during step 202, the operation proceeds to step 206 to determine if input rewind has been selected. Such a selection would cause the UIQ to be rewound to replay the previous input. If this option has been selected, the operation proceeds to step 208 to decrement the file counter by 1 and to step 198 to play mode, utilizing inputs from the UIQ starting with the previous instruction now indicated by the file counter.

If a "No" output is obtained during step 206, the operation proceeds to step 210 to determine if an N input rewind has been selected. This option permits the user to rewind by a selected number of inputs which the user may define. If this option is selected, the operation proceeds to step 212 during which the user selects the number of inputs for which the rewind is to be performed. This may be done by the user in response to a display prompt. During step 214, the file counter is then decremented by the selected number (N) and the operation returns to step 198 to replay from the UIQ starting at the input to which the file counter has been decremented.

Since, for the illustrative embodiment shown in FIG. 8, these are the only rewind options, if a "No" output is obtained during step 210, the operation performs a default rewind condition by proceeding to step 194, resulting in a rewind to the previous frame. Obviously, additional rewind options could be provided to the user if such rewind options were found to be desirable. The user is thus provided with a highly flexible rewind capability.

Figure 9:
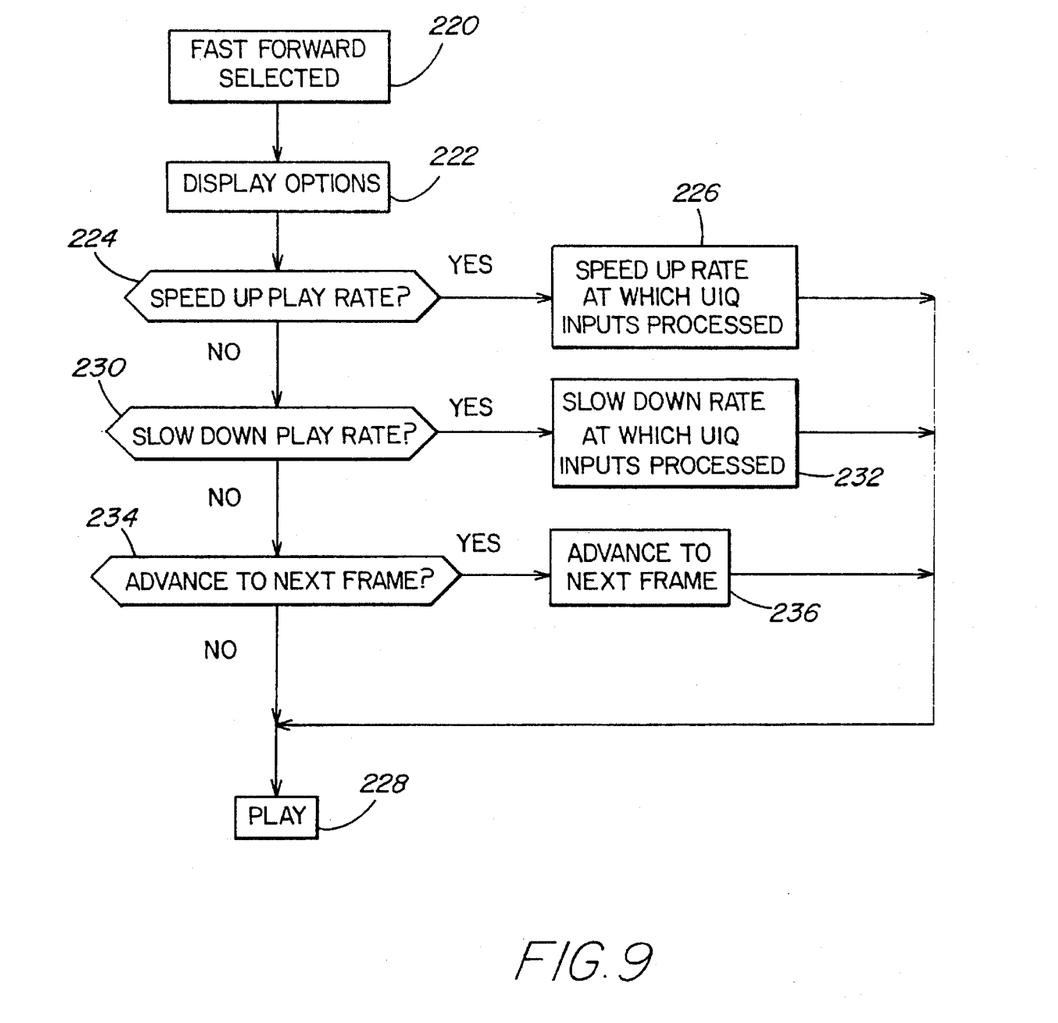
FIG. 9 is a flow diagram of fast forward operations in accordance with the teachings of this invention.

A second capability which is offered to the user when in play mode is a fast forward capability obtained by operating Fast Forward button 66. FIG. 9 is a flow diagram illustrating operations which may be performed when this fast forward button is selected.

Referring to FIG. 9, step 220 is performed when the fast forward button 66 is operated to select fast forward. This causes the operation to proceed to step 222 during which a pop-up display of fast forward options appears on display 30.

The next step in the operation is step 224 during which a determination is made as to whether the play rate should be speeded up or, in other words, whether speed-up play rate has been selected. When the user selects the speed-up play rate option, the play rate may be speeded up by a predetermined amount, or the user may be provided, either on the existing menu or on an additional pop-up menu, with a suitable menu or prompt permitting the user to select the rate of speed-up. From step 224, the operation proceeds to step 226 to speed up the rate at which UIQ inputs are processed either by a predetermined increment or by an amount selected by the user. Speed-up may be accomplished by modifying the durations in field 1 of the UIQ by a predetermined percentage. Thus, a 10% speedup in the play rate would result in the duration between each of the inputs being reduced by 10%. The speed-up is effected during the play step 228.

If a "No" output is obtained during step 224, the operation proceeds to step 230 to determine if the user has elected to slow down the play rate. Again, the slow down may be by a preset amount or the user may be provided with a capability of selecting a desired rate at which the play rate is to be reduced. If a "Yes" output is obtained during step 230, the operation proceeds to step 232 to slow down the play rate by either the predetermined amount or by the amount selected by the user. This would be accomplished by increasing the duration between inputs by a predetermined percentage. Thus, a 10% slow down in the play rate would result in the durations between inputs in the first field of the UIQ each being increased by 10% when utilized during play step 228.

If a "No" output is obtained during step 230, the operation proceeds to step 234 to determine whether advance-to-next-frame has been selected. If a "Yes" output is obtained during step 234, the operation proceeds to step 236 to increment or reset the file counter to the address of the next succeeding frame marker in the UIQ. From step 236, the operation proceeds to step 228 to utilize inputs from the UIQ starting at the frame marker address now in the file counter.

For the example indicated in FIG. 9, the options indicated are the only options available. Therefore, if a "No" output is obtained during step 234, the operation returns to play mode through step 228 without performing a fast forward operation. However, it is apparent that other fast forward options could be provided, including options such as those shown for rewind in FIG. 8. These would include advancing by a single input or advancing by a number of inputs (N) selected by the user.

Pause Mode Operation

Figure 10:
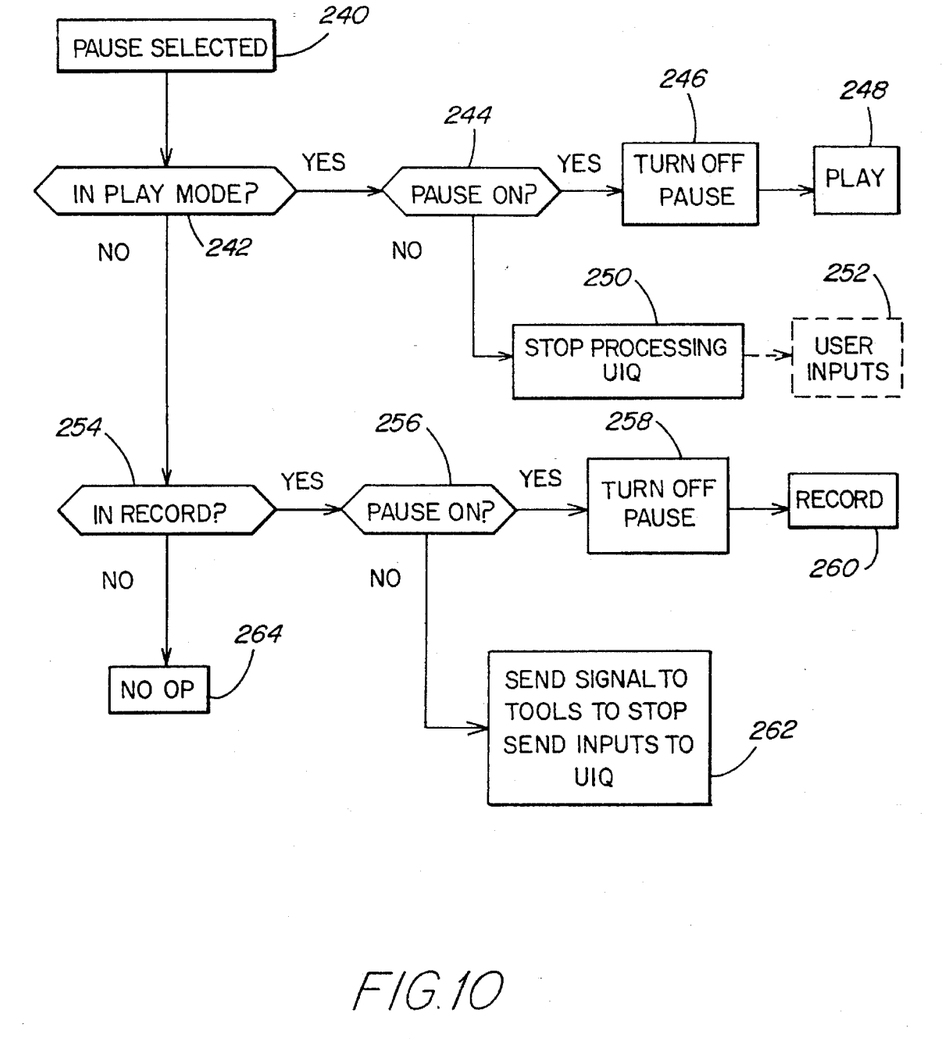
FIG. 10 is a flow diagram of the pause operations of this invention.

FIG. 10 is a flow diagram of the pause mode. Pause mode is entered when pause button 64 is operated. This is step 240 in FIG. 10. When pause is selected, a suitable indicator 56 may be illuminated although this is not specifically shown in FIG. 10.

Pause mode may be selected when in either playback or record mode. Thus, from step 240, the operation proceeds to step 242 to determine if the tool is in play mode. If the tool is in play mode, the operation proceeds to step 244 to determine if pause is also on. As was previously indicated, pause is a toggle control. Thus, if it is determined that pause is on during step 244, and pause has again been selected, the operation proceeds to step 246 to turn off pause. This permits normal play to resume (step 248) with inputs being read from the UIQ to control system operation.

If a "No" output is obtained during step 244, then the operation proceeds to step 250 to stop processing from the UIQ, temporarily halting the test operation. As illustrated by dotted box 252, during a pause operation, the user may input to the system or other selected operations may be performed before play is resumed.

If a "No" output is obtained during step 242, the operation proceeds to step 254 to determine if the tool is in record mode. If a "Yes" output is obtained during step 254, the operation proceeds to step 256 to determine if pause is on. A "Yes" output during step 256 results in pause being toggled off, the operation proceeding to step 258 to turn pause off and to step 260 to return to normal record operation. Normal record in this case would involve storing inputs to system tools in the UIQ.

If a "No" output is obtained during step 256, the operation proceeds to step 262 to send a signal to the system tools to stop sending inputs to the UIQ. This signal may be sent directly to the various application tools 84 (FIG. 4) or may merely be sent to the graphics manager 86.

Thus, a pause in record mode will prevent the recording of certain events or inputs in the UIQ which, for whatever reason, the user is not interested in utilizing in his test demonstration, training or other procedure. This is another way in which the size of the UIQ file can be reduced.

If the tool is in neither play nor record mode, then a pause operation is not appropriate and the operation proceeds to step 264 to provide a no-op indication to the user.

A flexible test procedure for systems utilizing interactive and integrated software products is thus provided. The procedure may be utilized either for the initial testing of one or more software products in the environment in which they are to be utilized or may be utilized either at a vendor site or in the field for debugging a system. In either case, the various tools of this invention may be run on the same processor that the remaining software products of the system are being run or a separate processor may be provided containing the tool of this invention which is used for testing or debugging existing systems. One potential problem in utilizing the system of this invention is that, where a different processor is being used for play mode than was used for recording the UIQ, differences in operating speed of the processors may cause erroneous operation. However, the rate-of-play controls provided in the fast forward option (FIG. 9) can be utilized to match the speeds of the two processors.

Another potential problem is that some changes may be made in the system or in one of the software products run thereon between the time that the UIQ is recorded and the time the UIQ is utilized in play mode. It is also possible that there may be some differences between the system on which the UIQ was recorded and the system on which it is being utilized. To the extent such differences are known, and records should be available from which such differences can be determined, the ability to provide additional inputs to the system in pause mode or during editing of the UIQ should permit such problems to be overcome.

The specific controls shown in FIG. 3 for the Automate tool have been chosen to emulate well-known VCR controls with which users are familiar so as to make the user interface easier to use. However, the specific controls shown and described are by way of illustration only and it is apparent that other controls might be utilized either in addition to or instead of one or more of the controls shown in FIG. 3. The hardware shown in FIG. 1, the display formats shown in FIGS. 2 and 3, the organization shown in FIG. 4, the UIQ storage format shown in FIG. 5, and the sequences of steps shown in FIGS. 6–10, are also all merely illustrative of a preferred embodiment and various changes may be made therein as required while still remaining within the scope of the invention. Thus, while the invention has been particularly shown and described above with reference to a preferred embodiment, the foregoing and other changes in form and detail may be made therein by one skilled in the art without departing from the spirit and scope of the invention.

What is claimed is:

1. A tool for use in an integrated system that utilizes at least one software product, comprising:

means for placing the tool in a record mode;

means for successively receiving received inputs from one or more different input sources in an order, a time interval expiring between receipt of each pair of successively received inputs;

means, operative when the tool is in the record mode, for providing the received inputs as inputs to the at least one software product, the at least one software product performing one or more selected functions in response to the received inputs;

means, operative when the tool is in the record mode, for generating a unified input queue (UIQ) of the received inputs in the order received by said receiving means to create a queued input corresponding to each of the received inputs, the generating means generating information that indicates the time interval expiring between receipt of each pair of successively received inputs;

means for storing the UIQ; and means for applying the queued inputs to the at least one software product in the order in which the corresponding received inputs were received and with a time interval expiring between application of each pair of successively applied queued inputs, the time interval expiring between application of each pair of successively applied queued inputs being proportional to the time interval expired between receipt of the corresponding pair of successively received inputs.

2. A tool as claimed in claim 1, wherein the tool receives inputs from separate input devices, at least one of which is a mouse, and wherein the means for generating provides to the UIQ an indication of the input source, wherein the means for storing stores the indication.

3. A tool as claimed in claim 1, including means for pausing the tool, the pausing means being responsive to a user input for inhibiting the generating means from adding inputs to the UIQ when the tool is in record mode and is paused.

4. A tool as claimed in claim 1, wherein the means for applying the queued inputs includes means for applying each pair of successively applied queued inputs to the at least one software product so that the time interval between application of each pair of successively applied queued inputs differs from the time interval between receipt of the corresponding pair of successively received inputs.

5. A tool as claimed in claim 1, wherein the means for applying is operative when the tool is in a play mode, and wherein the tool further includes:

means for pausing the tool when in the play mode, and means, responsive to said pausing means when the tool is in play mode, for inhibiting the means for applying from applying the queued inputs to the at least one software product.

6. A tool as claimed in claim 1, wherein said means for storing includes means for storing information in the UIQ regarding the at least one software product.

7. A method for storing inputs in a system having at least one software product, the system including a tool that can be put in a record mode, the method comprising the computer implemented steps of:

receiving a plurality of inputs from a user in an order;

providing the plurality of inputs to the system to perform, when the tool is in the record mode, one or more selected functions;

generating, when the tool is in the record mode, a unified input queue (UIQ) of the plurality of received inputs to the system in the order received;

determining timewise durations between the reception of successive ones of the plurality of inputs; and storing the UIQ so that the UIQ includes information relating to the determined timewise durations between the reception of successive ones of the plurality of inputs.

8. A method as claimed in claim 7, wherein the at least one software product includes plurality of software products, and wherein the steps of generating and storing the UIQ include providing the UIQ with information identifying which of the plurality of software products each of the plurality of received inputs relates to.

9. A method as claimed in claim 7, further comprising the step of receiving inputs from a plurality of separate input devices, at least one of which is a keyboard and another of which is a mouse, wherein the UIQ stores inputs from the plurality of different input sources and wherein each input in the UIQ includes information indicating the appropriate input source.

10. A method as claimed in claim 9 wherein one of the input sources is a mouse, and wherein the generating and storing step includes the step of indicating a mouse movement and the final location of the mouse at the end of the movement.

11. A method as claimed in claim 10 wherein said mouse has at least one button, and wherein the generating and storing step includes the step of indicating the operation of a particular button and the mouse location when such operation occurs.

12. A method as claimed in claim 9 wherein one of the input sources is a keyboard, and wherein the generating and storing step includes the step of indicating a keyboard input.

13. A method as claimed in claim 8 wherein an input may control a display window, and wherein said generating and storing step includes the step of indicating a display window for a given input.

14. A method as claimed in claim 8 wherein said generating and storing step includes the step of storing comments in the UIQ which may be viewed by a user when the UIQ is being utilized to exercise a system.

15. A method as claimed in claim 8 wherein said generating and storing step includes the step of storing system inputs in the UIQ.

16. A method as claimed in claim 7, including the step of temporarily halting, in response to a user input, the generation of inputs to the UIQ when the tool is in record mode, while continuing to receive non-recorded inputs from a user and to provide the non-recorded inputs to the system.

17. A method as claimed in claim 7, further including steps of applying stored inputs from the UIQ to the system in the order recorded.

18. A method as claimed in claim 17, wherein the applying step includes using the stored duration information relating to the determined timewise duration between inputs in the UIQ, and utilizing the stored duration information to apply the inputs at a rate derived from the information.

19. A method as claimed in claim 18, wherein the step of applying includes altering durations at which inputs are applied, and thus altering a play rate, the altered play rate being derived from the duration information.

20. A method as claimed in claim 17, including the step of temporarily pausing the step of applying inputs from the UIQ to the system while receiving non-recorded inputs and providing these non-recorded inputs to the system.

21. A method as claimed in claim 20, further including the step of reinitiating the step of applying the inputs from the UIQ to the system after at least some non-recorded inputs have been received and provided to the system.

22. A method as claimed in claim 17, further including a step of storing frame indications in the UIQ, and including the step of moving, in response to a user input and to the frame information, to a beginning of a selected frame in the UIQ so that the applying step provides further inputs to the system beginning at the beginning of the selected frame.

23. A method as claimed in claim 22 including a step of receiving a rewind signal, the moving step for rewinding to the beginning of a previous frame in response to the rewind signal.

24. A method as claimed in claim 22 further including a step of receiving an advance-to-next-frame signal, the moving step advancing in response to said signal to the beginning of a next frame to provide inputs beginning at the next frame.

25. A method as claimed in claim 17, including the steps of receiving signals indicating steps consisting of (N) inputs each, and in response applying inputs from the UIQ on a step-by-step basis.

26. A method as claimed in claim 25, including a step of receiving a signal indicating that one or more stored inputs are to be skipped, and, in response, the step of applying includes a step of skipping at least one of the inputs in the UIQ for application to the system.

27. The method of claim 7, further comprising steps of:

detecting in the UIQ a replay command for the at least one software product, and providing from the UIQ the plurality of inputs to the at least one software product.

28. A method for exercising an integrated system including at least one software product, the method comprising the steps of:

receiving, in an order, a plurality of received inputs to the system from a user during an interactive session between the user and the system;

storing in a memory the plurality of received inputs in the order received during the interactive session between the user and the system to generate a plurality of stored inputs, each of the plurality of stored inputs corresponding to one of the plurality of received inputs; and applying the plurality of stored inputs from the memory to the at least one software product, the applying step including a step of controlling a time interval between the application of each successive pair of stored inputs from the memory to the at least one software product, the time interval between the application of each successive pair of stored inputs being proportional to a time interval between reception of the corresponding pair of received inputs.

29. A method as claimed in claim 28, wherein the step of applying the plurality of stored inputs includes a step of applying the plurality of stored inputs from the memory to the at least one software product in an order that differs from the order in which the inputs to the system are received.

30. A method as claimed in claim 29 wherein the system includes a rewind control, and wherein said applying step includes changing a location from which a next input from the memory is to be obtained to a selected prior memory location in response to operation of said rewind control.

31. A method as claimed in claim 29, wherein the memory includes frame indications, and wherein the method includes a step of moving to a beginning of a selected frame for applying further inputs to the system.

32. A method as claimed in claim 28, further including steps of:

defining groups of N stored inputs, receiving at least one input signal indicating that the stored inputs are to be applied to the at least one software product group-by-group, and applying stored inputs from the memory to the at least one software product on a group-by-group basis in response to said at least one input signal.

33. A method as claimed in claim 32, including the steps of indicating that one or more inputs are to be skipped, and advancing by a predetermined number of inputs in the memory in response to receiving the skipped input indication.

34. A method as claimed in claim 28, including the step of pausing the application of inputs from the memory to the at least one software product and the storing of the plurality of received inputs in the memory while further received inputs are provided to the system.

35. A method as claimed in claim 28, wherein said step of controlling time intervals between the application of each successive pair of stored inputs includes a step of reducing the time intervals between reception of each successive pair of received inputs to speed the operation of the system.

36. A method as claimed in claim 28, wherein said step of controlling time intervals between the application of each successive pair of stored inputs includes a step of increasing the time intervals between reception of each successive pair of received inputs to slow the operation of the system.

37. A tool as claimed in claim 28, wherein said storing step includes storing an indication of the time intervals between the reception of successive received inputs; and wherein the step of controlling time intervals between the application of each successive pair of stored inputs includes the step of utilizing the stored time interval indications to control the time intervals between the application of the plurality of stored inputs.

38. A tool as claimed in claim 1 further comprising:

means for selectively pausing and reinitiating the tool when in the record mode so that inputs to the system are received without being stored; and means for selectively pausing and reinitiating the tool in a play mode so that inputs from the UIQ to the system are inhibited while the means for utilizing is operable to perform one or more of the selected functions.

39. A computer system for use with a software product which is interactively used by a user, the system comprising:

an input device for providing inputs to the system;

means for storing the inputs in a storage device in an order provided by the user in a record mode;

means for selectively pausing the storing means so that when the storing means is paused, inputs received from the user are not stored in the storage device;

means, operative when the storing means is paused, for reinitiating the storing means so that inputs received from the user are stored in the storage device in an order provided by the user, the inputs received following reinitiation of the storing means being stored in combination with the inputs received before the storing means is paused;

means for providing the stored inputs as inputs from the storage device to the interactive program in a play mode;

means for selectively pausing the providing means so that when the providing means is paused, the stored inputs are not provided from the storage device to the interactive program and the interactive program is operable to receive inputs from the user to the interactive program; and means, operative when the providing means is paused, for reinitiating the providing means so that stored inputs are again provided from the storage device to the interactive software product, the stored inputs provided following reinitiation of the providing means including inputs stored before the providing means was paused.

40. A computer system including a software product that is interactively used by a user, the system comprising:

means for placing the system in a record mode;

an input device that receives a plurality of inputs from a user;

means, operative when the system is in the record mode, for providing the plurality of received inputs as inputs to the software product, the software product performing one or more selected functions in response to the plurality of received inputs;

storage means, operative when the system is in the record mode and having a plurality of locations, for storing the inputs in locations indicating an order in which the inputs are received from the user;

means for applying to the software product the stored inputs from the storage means in the order; and means for altering the order so that the applying means provides, after a first input, a next input stored in the storage means, wherein the next input is at a location indicating that at least one intermediate input was received between the first input and the next input.

41. The tool of claim 40, wherein the altering means is a rewind control, wherein the next input is in the storage means at a location indicating that it was received prior to the first input.

42. The tool of claim 40, wherein the altering means is a fast forward control, wherein the next input is in the storage means at a location indicating that intermediate inputs were received between the first and next inputs.

43. The tool of claim 40, further including means, responsive to user input, for providing a frame indication at a location in the storing means, a frame being a location in memory and having all information necessary to start applying inputs for that location.

44. The tool of claim 43, further including means for pointing to the frame location so that a next applied input is at the frame location.

45. A tool for use in an integrated system that includes at least one software product, the system successively receiving first, second and third received inputs in an order, a first received time interval expiring between receipt of the first and second received inputs and a second received time interval expiring between receipt of the second and third inputs, the second received time interval being different from the first received time interval, the tool comprising:

means for placing the tool in a record mode;

means, operative when the tool is in the record mode, for providing the first, second and third received inputs as inputs to the at least one software product, the at least one software product performing one or more selected functions in response to the received inputs;

storing means, operative when the tool is in the record mode, for storing the first, second and third received inputs in the order received by the system to respectively create first, second and third stored inputs, the storing means storing information that indicates the first and second received time intervals; and means for applying the first, second and third stored inputs to the at least one software product in the order in which the first, second and third received inputs were received by the system, a first applied time interval between the application of the first and second stored inputs being proportional to the first received time interval, a second applied time interval between the application of the second and third stored inputs being proportional to the second received time interval.

46. The tool of claim 45, wherein the first applied time interval equals the first received time interval and the second applied time interval equals the second received time interval.

47. The tool of claim 45, wherein the first applied time interval is greater than the first received time interval and the second applied time interval is greater than the second received time interval.

48. The tool of claim 45, wherein the first applied time interval is less than the first received time interval and the second applied time interval is less than the second received time interval.

49. The tool of claim 45, wherein the first applied time interval divided by the first received time interval equals the second applied time interval divided by the second received time interval.

* * * * *